United States Patent
Parette

(10) Patent No.: US 10,468,976 B2
(45) Date of Patent: Nov. 5, 2019

(54) METHOD FOR DIAGNOSING A FAULT IN CURRENT-MODE CONTROL OF AN ELECTRIC MOTOR IN A MOTOR VEHICLE

(71) Applicants: Continental Automotive France, Toulouse (FR); Continental Automotive GmbH, Hannover (DE)

(72) Inventor: Michel Parette, Fonsorbes (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/092,847

(22) PCT Filed: Apr. 10, 2017

(86) PCT No.: PCT/FR2017/050856
§ 371 (c)(1),
(2) Date: Oct. 11, 2018

(87) PCT Pub. No.: WO2017/178744
PCT Pub. Date: Oct. 19, 2017

(65) Prior Publication Data
US 2019/0207510 A1    Jul. 4, 2019

(30) Foreign Application Priority Data

Apr. 15, 2016   (FR) ...................... 16 53344

(51) Int. Cl.
*H02M 1/38*        (2007.01)
*H02P 27/08*       (2006.01)
(Continued)

(52) U.S. Cl.
CPC ............... *H02M 1/38* (2013.01); *H02M 1/32* (2013.01); *H02M 7/219* (2013.01); *H02P 27/08* (2013.01);
(Continued)

(58) Field of Classification Search
CPC .... H02M 1/32; H02M 1/38; H02M 1/753871; H02P 27/08; H02P 29/024
See application file for complete search history.

(56) References Cited

U.S. PATENT DOCUMENTS

2006/0006834 A1    1/2006   Suzuki
2006/0007713 A1*   1/2006   Brown ................ H02M 3/1588
                                                363/17
(Continued)

OTHER PUBLICATIONS

English translation of the Written Opinion for International Application No. PCT/FR2017/050856, dated Jun. 21, 2017, 5 pages.
(Continued)

*Primary Examiner* — Fred E Finch, III
(74) *Attorney, Agent, or Firm* — RatnerPrestia

(57) ABSTRACT

A method for diagnosing a fault in the control of a three-phase electric motor current-mode controlled by a control signal. The method makes it possible to calculate the actual dead time present in each of the three control signals at a given time on the basis of compensated temporal offsets for each phase of the motor, of a predetermined measurement error common to the three phases of the motor and of a value of a amplitude of the current flowing through the transistors of the three pairs of transistors at the given time so as to detect a fault in the control of the motor when the absolute value of the calculated difference is higher than a predetermined detection threshold.

12 Claims, 5 Drawing Sheets

(51) Int. Cl.
*H02M 1/32* (2007.01)
*H02M 7/219* (2006.01)
*H02P 29/024* (2016.01)
*H02M 7/5387* (2007.01)

(52) U.S. Cl.
CPC ..... *H02P 29/0241* (2016.02); *H02M 7/53871* (2013.01)

(56) References Cited

U.S. PATENT DOCUMENTS

| | | | |
|---|---|---|---|
| 2007/0030705 A1* | 2/2007 | Yamamoto | H02M 7/53873 363/41 |
| 2007/0194746 A1* | 8/2007 | Yoshimoto | H02M 7/483 318/801 |
| 2009/0066384 A1 | 3/2009 | Suzuki et al. | |
| 2016/0013739 A1* | 1/2016 | Tsuchida | H02P 27/08 318/400.13 |
| 2017/0040894 A1* | 2/2017 | MeVay | H03K 5/1532 |
| 2018/0287544 A1* | 10/2018 | Kato | H02M 1/32 |

OTHER PUBLICATIONS

International Search Report and Written Opinion for International Application No. PCT/FR2017/050856, dated Jun. 21, 2017—8 pages.

\* cited by examiner

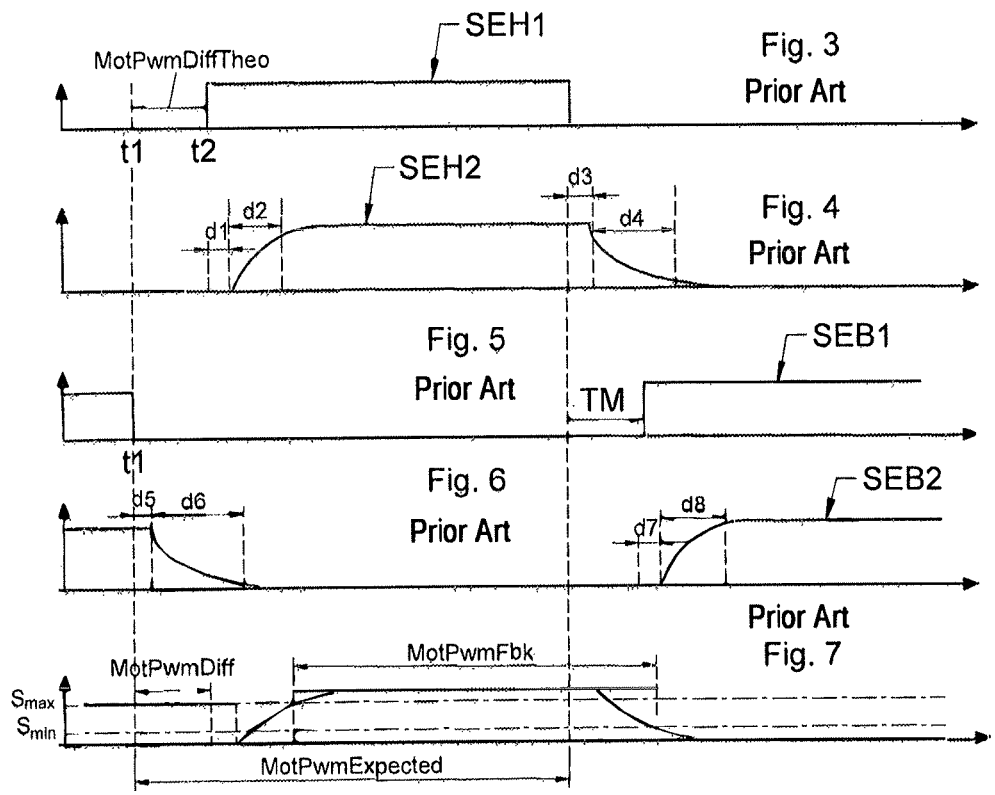
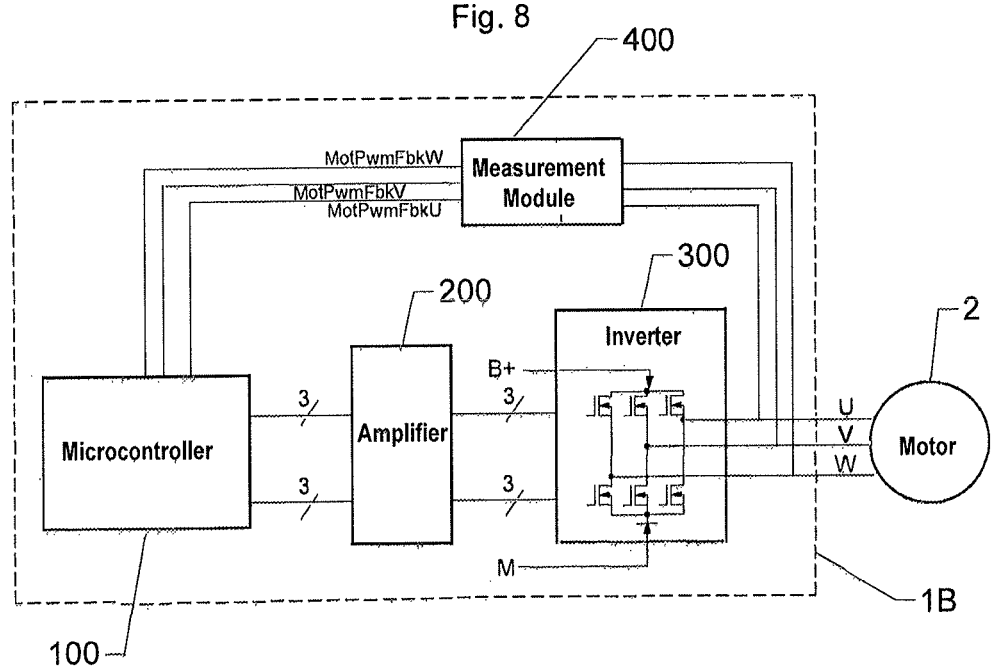

METHOD FOR DIAGNOSING A FAULT IN CURRENT-MODE CONTROL OF AN ELECTRIC MOTOR IN A MOTOR VEHICLE

CROSS REFERENCE TO RELATED APPLICATIONS

This application is the U.S. National Phase Application of PCT International Application No. PCT/FR2017/050856, filed Apr. 10, 2017, which claims priority to French Patent Application No. 1653344, filed Apr. 15, 2016, the contents of such applications being incorporated by reference herein.

FIELD OF THE INVENTION

The invention relates to the field of motor vehicles and relates more particularly to a method for diagnosing the current-mode control of an electric motor of a motor vehicle. The invention applies in particular to the current-mode control of a three-phase electric motor.

BACKGROUND OF THE INVENTION

In a motor vehicle with a three-phase electric motor, the motor is controlled in a known manner by using three AC current-mode control signals delivered by a control device.

In one existing solution illustrated in FIG. 1, this device 1A comprises a microcontroller 10, an amplifier 20 and a power stage taking the form of an inverter 30 allowing these three signals U, V, W for current-mode controlling the motor 2 to be generated.

More specifically, the microcontroller 10 first generates six low-amplitude pulse-width modulated (PWM) AC primary signals (two per phase of the motor 2), the amplitude of which corresponds to the amplitude of the power supply signal of the microcontroller 10, for example of the order of 5 V. These signals each alternate between high states (or active states) and low states (or inactive states).

These signals are next amplified by the amplifier 20 so as to reach for example an amplitude of the order of 20 V (when the battery voltage B of the vehicle is of the order of 10 V, for example) then transmitted to the inverter 30 which delivers, as output, the three signals U, V, W for current-mode controlling the motor 2, which also exhibit alternation between high states and low states. Each phase of the motor 2 is then controlled in a known manner by the offset existing between two of the three control signals U, V, W, pairwise.

For this purpose, the inverter 30 comprises three pairs of MOSFET transistors, each generating one of the three signals U, V, W for current-mode controlling the motor 2. One of the transistors (the high-stage transistor) in each transistor pair is connected to the positive terminal of the battery B of the vehicle while the other (the low-stage transistor) is connected to ground M. The two transistors of a pair each receive an amplified primary signal, these two amplified primary signals being centered (i.e. the centers of the pulses coincide) but inverted. In practice, the pulses of these amplified primary signals are not square but exhibit a rising slope and a falling slope.

To prevent the two transistors of one and the same pair allowing the current through at the same time, which would connect the battery voltage to ground (short-circuit) and could damage the control device 1A or even the motor 2, the microcontroller 10 observes a dead time between a pulse of the primary single intended for the high stage of a given pair of transistors and the pulse associated with the primary single that is intended for the low stage of said pair. In practice, as illustrated in the example given in FIG. 2, the two high-stage SEH1 and low-stage SEB1 signals remain centered but the width of one of the two primary signals (the high-stage signal SEH1 in this example) is decreased so as to prevent the two signals SEH1 and SEB1 being in the active state at the same time.

Examples of signals of the control device 1A (illustrated for a PWM signal cycle) are shown in FIGS. 3 to 6. More specifically, FIG. 3 illustrates a high-stage signal SEH1 generated by the microcontroller 10 intended for a high-stage transistor of a pair of transistors, FIG. 4 illustrates the output signal SEH2 of said high-stage transistor, FIG. 5 illustrates a low-stage signal SEB1 generated by the microcontroller 10 intended for the low-stage transistor of said pair of transistors and FIG. 6 illustrates the output signal SEB2 of said low-stage transistor. It can thus be seen in FIGS. 3 and 5 that the microcontroller 10 observes a dead time MotPwmDiffTheo between the end $t_1$ of an active state of the low-stage signal SEB1 and the start $t_2$ of an active state of the high-stage signal SEH1. It can be seen in FIG. 4 that an initiation delay $d_1$ followed by a rise time $d_2$ is required by the high-stage transistor for the output signal SEH2 of the transistor to reach the active state, then a deactivation delay $d_3$ for the transistor followed by a fall time $d_4$ for the output signal SEH2 is required for the transistor to switch to the inactive state. Similarly, it can be seen in FIG. 6 that a deactivation delay $d_5$ followed by a fall time $d_6$ is required by the low-stage transistor for the output signal SEB2 of the transistor to reach the inactive state, then an initiation delay $d_7$ for the transistor followed by a rise time $d_8$ for the output signal SEB2 is required for the transistor to switch to the active state.

The dead time MotPwmDiffTheo observed by the microcontroller 10 between two primary signals intended for a pair of transistors, referred to hereinafter as the inserted dead time, is limited to 500 ns so as not to negatively affect the performance of the motor 2. Specifically, an increase in the duration of the dead time MotPwmDiffTheo results in a decrease in the width of the high states SEH1 of the signals U, V, W for controlling the motor 2 and hence in less effective current-mode control of the motor 2, in particular beyond 500 ns of dead time.

To diagnose a fault in the control of the motor 2, it is known practice to measure the actual dead time present in the control signals. In a first existing solution, the six primary signals SEH1, SEB1 generated by the microcontroller 10 are measured. Such a solution however makes it possible only to diagnose a fault in the dead times inserted by the microcontroller 10, i.e. a fault in the microcontroller 10 itself. However, it is observed that the duration of the dead time inserted by the microcontroller 10 into the primary signals SEH1, SEB1 may be modified by the amplifier 20 or the inverter 30. Specifically, when using the vehicle, the transistors of the inverter 30 may heat up and modify the duration of the dead times of the control signals U, V, W output by the inverter 30, which may negatively affect the current-mode control of the motor 2. Therefore, in a second existing solution, the device 1A comprises a measurement module 40 which determines the rise times of the control signals U, V, W and compares them with the rise times of the primary signals SEH1, SEB1 generated by the microcontroller 10. However, such a solution does not make it possible to detect a fault in the microcontroller 10. Moreover, the latency time taken for such calculations allows an accuracy only of the order of a microsecond to be obtained, i.e. twice the maximum duration of a dead time (500 ns), particularly as the dead time is affected by the effects of the current flowing through the transistors, the measurement errors caused by the measurement module 40, the delays introduced by the electronic filters, and the rise and fall times of the primary signals SEH1, SEB1 and of the control signals U, V, W, thereby making the method inaccurate or even random and therefore presenting a major drawback.

SUMMARY OF THE INVENTION

An aspect of the invention aims to solve these drawbacks at least partly by providing a simple, reliable and effective solution for measuring the dead times inserted into the control signals for controlling an electric motor.

To this end, a first aspect of the invention is a method for diagnosing a fault in the control of a three-phase electric motor, each phase of said motor being current-mode controlled by a control signal, said control signal being pulse-width modulated and being generated at the midpoint of an assembly formed by a "high-stage" transistor connected to the battery of the vehicle and a "low-stage" transistor connected to ground on the basis of a high-stage signal received by the high-stage transistor and a low-stage signal received by the low-stage transistor, the high-stage signal and the low-stage signal being pulse-width modulated signals, which signals are inverted with respect to one another and each high state of the high-stage signal of which is centered on a low state of the low-stage signal, said method comprising the following steps:

for each control signal for controlling a phase of the motor,
  generating the high-stage signal and the low-state signal, the start of a high state of the high-state signal being temporally offset by a duration referred to as the "inserted dead time" with respect to the start of the corresponding low state of the low-state signal,
  generating the control signal on the basis of the generated high-stage signal and low-state signal,
  measuring and formatting the control signal,
  calculating the difference between the duration of a high state of the generated high-stage signal added to the value of the inserted dead time and the duration of the formatted control signal, said difference varying sinusoidally with time,
  compensating for the calculated difference so that it oscillates about a zero value with time,
calculating the actual dead time present in each of the three control signals at a given time on the basis of the compensated temporal offsets for each phase of the motor, of a predetermined measurement error common to the three phases of the motor and of the value of the amplitude of the current flowing through the transistors of the three pairs of transistors at said given time,
calculating the difference between the calculated dead time and the inserted dead time,
detecting a fault in the control of the motor when the absolute value of the calculated difference is higher than a predetermined detection threshold.

The method according to an aspect of the invention makes it possible to calculate, in real time, the actual dead time in order to take into account the negative effects of the transistors and filters on the inserted dead time. The actual dead time is accurately calculated on the basis of the measured and formatted control signals. The method thus makes it possible to measure with accuracy, of the order of 250 ns, the actual dead time present in the control signals in order to effectively detect a fault in said control signals.

According to one aspect of the invention, the method comprises a step of determining the measurement error common to the three phases of the motor, this determination operation being performed by taking the mean of the temporal offsets calculated with zero current flowing through the high-stage transistor and the low-stage transistor for each phase of the motor.

Advantageously, the operation of calculating the actual dead time in each of the three formatted control signals at a given time comprises:
  calculating the slope of a straight line representing the variation of the dead time with current,
  calculating a difference between the value of the inserted dead time corrected for the predetermined measurement error and the value of the dead time at a given current amplitude on the basis of the calculated slope value.

Again advantageously, the slope of the straight line representing the variation of the dead time with current is calculated according to the following equation:

$$A = \frac{MotPwmDiffTheo - \dfrac{MotPwmDiffInitial}{2} - MotPwmDiffLinInit}{IphAmpMax - IphAmpLinThr}$$

where MotPwmDiffTheo is the inserted dead time, MotPwmDiffInitial is the measurement error common to the three phases of the motor, MotPwmDiffLinInit is the value of the dead time corresponding to the current threshold IphAmpLinThr from which the dead time varies linearly with current and IphAmpMax is the maximum amplitude value of the current.

Preferably, the difference between the value of the inserted dead time corrected for half of the predetermined measurement error and the value of the dead time at a given current amplitude is calculated according to the following equation:

$$MotPwmDiffIphCorr = (IphAmpMax - ampl(i)) \times A$$

where ampl(i) is the given current (I) amplitude.

Again preferably, the actual dead time is calculated according to the following equation:

$$MotPwmDiffCalc = MotPwmDiffIphCorr + \frac{X}{2} + \frac{MotPwmDiffInitial}{2}$$

where X=abs(min(MotPwmDiffCorrU,MotPwmDiffCorrV,MotPwmDiffCorrW)+max(MotPwmDiffCorrU,MotPwmDiffCorrV,MotPwmDiffCorrW)).

The use of a theoretical straight line makes it possible to refine the calculation of the dead time such that it can be calculated with an accuracy of the order of 250 ns or less.

An aspect of the invention also relates to a device for diagnosing a fault in the control of a three-phase electric motor, each phase of said motor being current-mode controlled by a control signal, said control signal being pulse-width modulated and being generated at the midpoint of an assembly formed by a "high-stage" transistor connected to the battery of the vehicle and a "low-stage" transistor connected to ground on the basis of a high-stage signal received by the high-stage transistor and a low-stage signal received by the low-stage transistor, the high-stage signal and the low-stage signal being pulse-width modulated signals, which signals are inverted with respect to one another and each high state of the high-stage signal of which is centered on a low state of the low-stage signal, said device comprising:

a microcontroller configured to generate, for each control signal for controlling a phase of the motor, a high-stage signal and a low-state signal, the start of a high state of the high-state signal being temporally offset by a duration referred to as the "inserted dead time" with respect to the start of the corresponding low state of the low-state signal, an amplifier configured to amplify said high-stage and low-stage signals, an inverter configured to generate, for each phase of the motor, a control signal on the basis of a pair of amplified high-stage and low-state signals, a measurement module configured to measure and to format the generated control signals, the microcontroller further being configured:

to calculate, for each control signal for controlling a phase of the motor, the difference between the duration of a high state of the generated high-stage signal added to the value of the inserted dead time and the duration of the formatted control signal, said difference varying sinusoidally with time, to compensate, for each control signal for controlling a phase of the motor, for the calculated difference so that it oscillates about a zero value with time, to calculate the actual dead time present in each of the three control signals at a given time on the basis of the compensated temporal offsets for each phase of the motor, of a predetermined measurement error common to the three phases of the motor and of the value of the amplitude of the current flowing through the transistors of the three pairs of transistors at said given time, to calculate the difference between the calculated dead time and the inserted dead time, to detect a fault in the control of the motor when the absolute value of the calculated difference is higher than a predetermined detection threshold.

According to one feature of an aspect of the invention, the device is configured to determine the measurement error common to the three phases of the motor, this determination operation being performed by taking the mean of the temporal offsets calculated with zero current flowing through the high-stage transistor and the low-stage transistor for each phase of the motor.

According to another feature of an aspect of the invention, the device is configured to calculate the slope of a straight line representing the variation of the dead time with current, and to calculate a difference between the value of the inserted dead time corrected for the predetermined measurement error and the value of the dead time at a given current amplitude on the basis of the calculated slope value so as to calculate the actual dead time in each of the three formatted control signals at a given time.

Preferably again, the slope of the straight line representing the variation of the dead time with current is calculated according to the following equation:

$$A = \frac{MotPwnDiffTheo - \dfrac{MotPwmDiffInitial}{2} - MotPwmDiffLinInit}{IphAmpMax - IphAmpLinThr}$$

where MotPwmDiffTheo is the inserted dead time, MotPwmDiffInitial is the measurement error common to the three phases of the motor, MotPwmDiffLinInit is the value of the dead time corresponding to the current threshold IphAmpLinThr from which the dead time varies linearly with current and IphAmpMax is the maximum amplitude value of the current.

Preferably again, the difference (MotPwmDiffIphCorr) between the value of the inserted dead time (MotPwmDiffTheo) corrected for half of the predetermined measurement error (MotPwmDiffInitial) and the value of the dead time (TM(I)) at a given current I amplitude is calculated according to the following equation:

MotPwmDiffIphCorr=(IphAmpMax−ampI($i$))×$A$

Advantageously, the observed dead time (MotPwmDiffCalc) is determined according to the following equation:

$$MotPwmDiffCalc = MotPwmDiffIphCorr + \frac{X}{2} + \frac{MotPwmDiffInitial}{2}$$

where X=abs(min(MotPwmDiffCorrU,MotPwmDiffCorrV,MotPwmDiffCorrW)+max(MotPwmDiffCorrU,MotPwmDiffCorrV,MotPwmDiffCorrW)).

An aspect of the invention also relates to a motor vehicle comprising a device such as presented above.

BRIEF DESCRIPTION OF THE DRAWINGS

Other features and advantages of aspects of the invention will emerge during the following description, given with reference to the appended figures, which are given by way of non-limiting example and in which identical references are given to similar objects.

FIG. 3 is an example of an initial high-stage signal generated by a microcontroller.

FIG. 4 is an example of an output signal of a high-stage transistor having received the signal of FIG. 3.

FIG. 5 is an example of an initial low-stage signal generated by a microcontroller.

FIG. 6 is an example of an output signal of a low-stage transistor having received the signal of FIG. 5.

FIG. 7 is an example of a control signal formatted by a measurement module.

FIG. 8 schematically illustrates a device for controlling and for diagnosing the signals for current-mode controlling an electric motor according to an aspect of the invention.

DETAILED DESCRIPTION OF THE PREFERRED EMBODIMENTS

Figure 1:
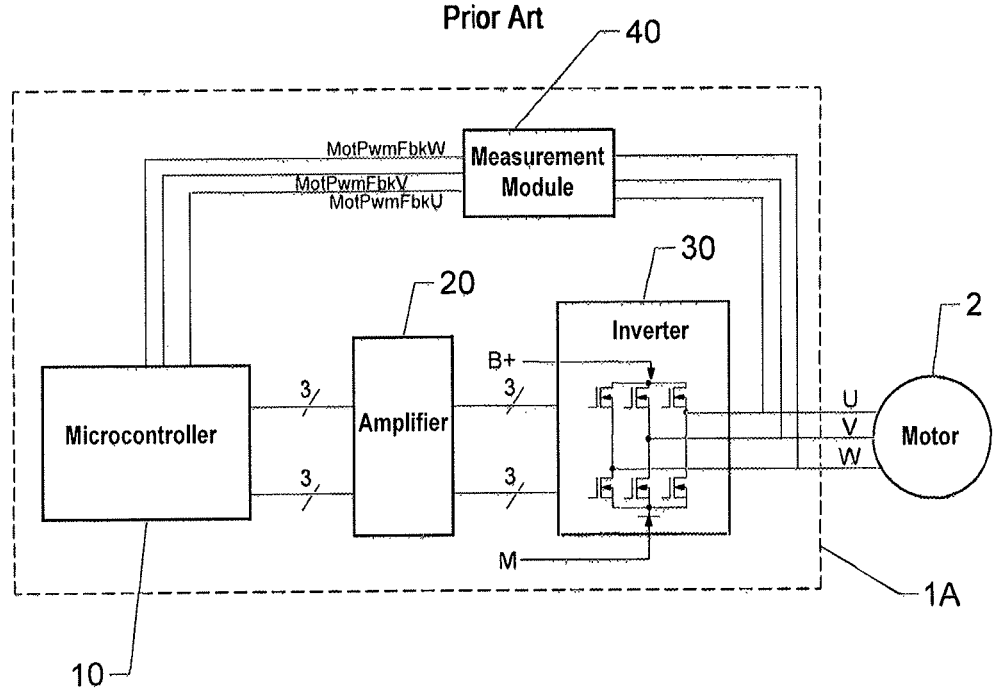
FIG. 1 schematically illustrates a device for controlling and for diagnosing the signals for current-mode controlling an electric motor of the prior art.
Figure 2:
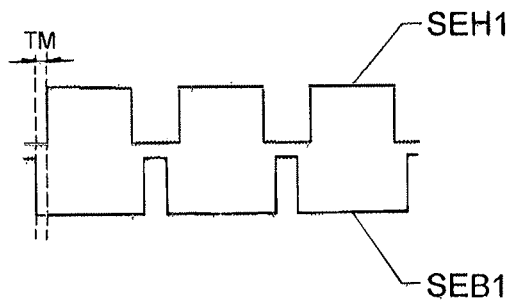
FIG. 2 is an example of initial high- and low-stage signals generated by a microcontroller.

The device according to an aspect of the invention is intended to be mounted in a motor vehicle with an electric motor for the purpose of current-mode controlling said motor and diagnosing a fault in the control of said motor.

With reference to FIG. 8, the electric motor 2 is a motor with three phases U, V, W, or a three-phase motor, but it goes without saying that an aspect of the invention could be applied to any electric motor for a motor vehicle.

Each phase U, V, W of the motor 2 is current-mode controlled by a respective control signal U, V, W generated by the control device 1B.

To this end, the control device 1B comprises a microcontroller 100, an amplifier 200 and a power stage taking the form of an inverter 300.

The microcontroller 100 is configured to generate three pairs of pulse-width modulated (PWM) voltage signals, referred to as initial signals, a single pair of which has been shown in FIGS. 3 and 5 for the sake of clarity. The high-stage signals of these three pairs are identical but phase-shifted with respect to one another, like their low-stage signals, so as to allow the three-phase electric motor 2 to be controlled. More specifically, the motor 2 is controlled by the phase differences between the three current-mode control signals U, V, W generated by the inverter 300 on the basis of the three pairs of initial signals SEH1, SEB1.

Each pair of initial signals comprises a high-stage signal SEH1 (FIG. 3) and a low-stage signal SEB1 (FIG. 5), each of which is pulse-width modulated and inverted with respect to the other and each high state of the high-stage signal SEH1 of which is centered on a low state of the low-stage signal SEB1. As illustrated in FIGS. 3 and 5, the start $t_2$ of a high state of the high-stage signal SEH1 is temporally offset by a duration MotPwmDiffTheo referred to as the "inserted dead time" with respect to the start $t_1$ of the corresponding low state of the low-state signal SEB1.

However, since the capabilities of the microcontroller 100 allow only signals of low amplitude to be generated (the microcontroller 100 operating on the basis of a power supply signal of the order of 5 V), it is necessary to amplify these initial signals before delivering them to the inverter 300 for the purpose of generating the control signals U, V, W for controlling the motor 2.

The role of the amplifier 200 is to amplify the three pairs of initial signals SEH1, SEB1 generated by the microcontroller 100 so that their amplitude is sufficient for controlling the motor 2, before delivering them to the inverter 300.

The inverter 300 is configured to generate the three control signals U, V, W for controlling the motor 2 on the basis of the three amplified pairs of initial signals SEH1, SEB1 delivered by the amplifier 200. To this end, as illustrated in FIG. 8, the inverter 300 comprises three pairs of transistors, at the midpoint of each of which a current-mode control signal U, V, W is generated.

Each control signal U, V, W is pulse-width modulated and is generated at the midpoint of an assembly formed by a "high-stage" transistor connected to the battery B of the vehicle and a "low-stage" transistor connected to ground M on the basis of an amplified high-stage signal SEH1 received by the high-stage transistor and an amplified low-stage signal SEB1 received by the low-stage transistor.

The actual dead time present in the control signals is different from the dead time inserted by the microcontroller 100 because the electronic components of the control device 1B, in particular those of the inverter 300, cause the actual duration thereof to vary, for example when the transistors of the inverter 300 heat up.

Examples of signals of the control device (illustrated for a PWM signal cycle) are shown in FIGS. 3 to 6. More specifically, FIG. 3 illustrates a high-stage signal SEH1 generated by the microcontroller 100 intended for a high-stage transistor of a pair of transistors, FIG. 4 illustrates the output signal SEH2 of said high-stage transistor, FIG. 5 illustrates a low-stage signal SEB1 generated by the microcontroller 100 intended for the low-stage transistor of said pair of transistors and FIG. 6 illustrates the output signal SEB2 of said low-stage transistor. It can thus be seen in FIGS. 3 and 5 that the microcontroller 100 observes a dead time MotPwmDiffTheo between the end $t_1$ of an active state of the low-stage signal SEB1 and the start $t_2$ of an active state of the high-stage signal SEH1. It can be seen in FIG. 4 that an initiation delay $d_1$ followed by a rise time $d_2$ is required by the high-stage transistor for the output signal SEH2 of the transistor to reach the active state, then a deactivation delay $d_3$ for the transistor followed by a fall time $d_4$ for the output signal SEH2 is required for the transistor to switch to the inactive state. Similarly, it can be seen in FIG. 6 that a deactivation delay $d_5$ followed by a fall time $d_6$ is required by the low-stage transistor for the output signal SEB2 of the transistor to reach the inactive state, then an initiation delay $d_7$ for the transistor followed by a rise time $d_8$ for the output signal SEB2 is required for the transistor to switch to the active state. With reference to FIG. 7, the duration of the high state of the high-stage signal SEH1 added to the duration of the (theoretical) inserted dead time is denoted by MotPwmExpected and referred to as the expected duration.

The measurement module 400 is configured to measure the control signals U, V, W generated by the inverter 300, to format them (known per se) as signals MotPwmFbkU, MotPwmFbkV, MotPwmFbkW that the microcontroller 100 is able to read and to analyse and to deliver them to the microcontroller 100 in a feedback loop. It will be noted that the control signals U, V, W and the formatted control signals MotPwmFbkU, MotPwmFbkV, MotPwmFbkW exhibit features that are almost identical in terms of dead time and temporal offsets (to within the slight delay caused by the filters of the measurement module 400).

FIG. 7 illustrates the formatted control signal associated with the signals of FIGS. 3 to 6. The duration MotPwmFbk of the high state of this signal is defined between a first time at which the value of the signal crosses a maximum threshold $S_{max}$ and a second time at which the value of the signal crosses a minimum threshold $S_{min}$.

For each formatted control signal MotPwmFbkU, MotPwmFbkV, MotPwmFbkW of a phase of the motor 2, the microcontroller 100 is configured to calculate the difference MotPwmDiffU, MotPwmDiffV, MotPwmDiffW between the expected duration MotPwmExpected and the duration MotPwmFbk of a high state of the formatted control signal MotPwmFbkU, MotPwmFbkV, MotPwmFbkW, this difference MotPwmDiffU, MotPwmDiffV, MotPwmDiffW varying sinusoidally with time.

Figure 9:
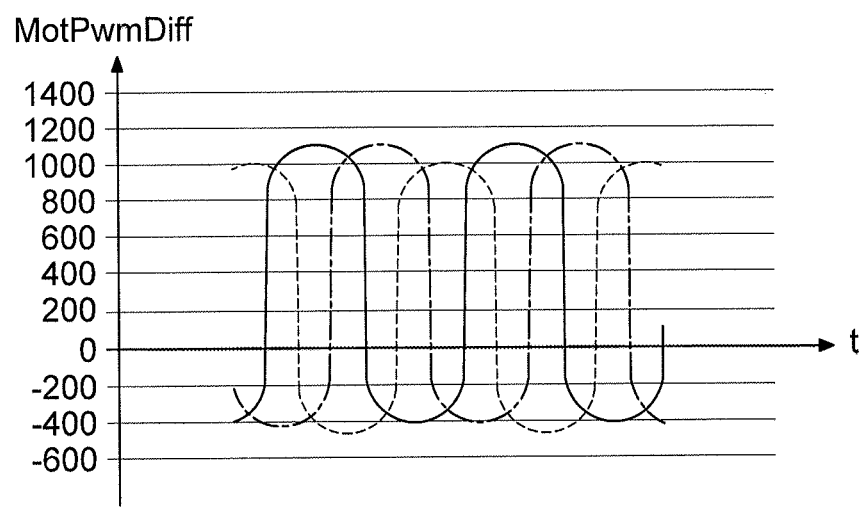
FIG. 9 schematically illustrates the temporal variations in the differences between the expected durations and the durations of the high states of the initial signals for the three phases of the motor.
Figure 10:
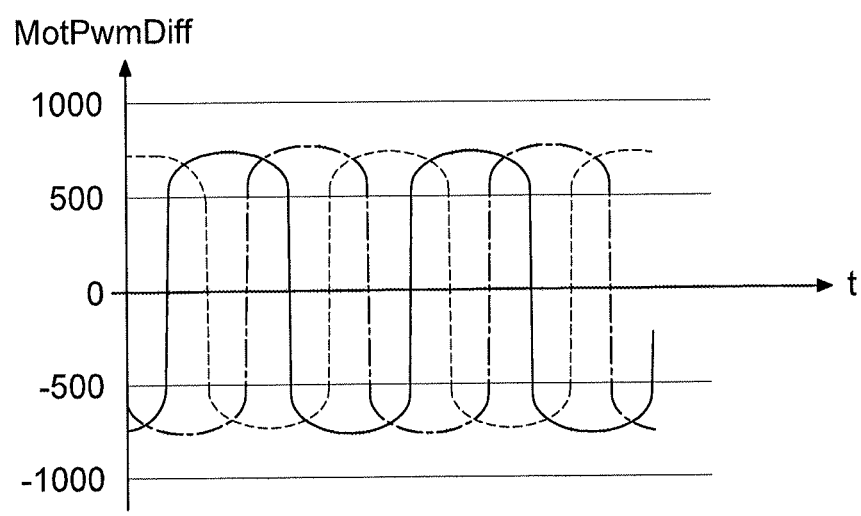
FIG. 10 schematically illustrates the differences of FIG. 9 which have been centered so as to vary about zero.

As illustrated in FIG. 9, these differences MotPwmDiffU, MotPwmDiffV, MotPwmDiffW oscillate with time about a nonzero central value which corresponds to the measurement errors due in particular to the heating of the transistors of the inverter 300. Next, for each formatted control signal MotPwmFbkU, MotPwmFbkV, MotPwmFbkW of a phase of the motor 2, the microcontroller 100 is configured to compensate for the calculated difference MotPwmDiffU, MotPwmDiffV, MotPwmDiffW so that it oscillates about a zero value with time t. The microcontroller 100 corrects this drift by centering the signal representing the actual dead time present in the signal for controlling the motor 2 on zero with time as illustrated in FIG. 10.

The microcontroller 100 is next configured to calculate the actual dead time MotPwmDiffCalc present in each of the three formatted control signals MotPwmFbkU, MotPwmFbkV, MotPwmFbkW at a given time on the basis of:
- the compensated temporal offsets MotPwmDiffCorrU, MotPwmDiffCorrV, MotPwmDiffCorrW for each phase U, V, W of the motor 2,
- a predetermined measurement error common to the three phases U, V, W of the motor 2, and
- the value of the amplitude of the current I flowing through the transistors of the three pairs of transistors at said given time.

The measurement error is an error that is common to the three phases of the motor 2. It is determined by the microcontroller 100 by taking the mean of the temporal offsets calculated with zero current flowing through the high-stage transistor and the low-stage transistor for each phase of the motor 2.

The microcontroller 100 calculates the actual dead time by assuming that the maximum reachable dead time is equal to the dead time theoretically inserted by the microcontroller 100, from which half of the measurement error common to the three control signals with zero current is subtracted.

The actual dead time may be calculated when the amplitude of the current flowing through the transistors of the inverter 300 is higher than a minimum current threshold determined by the microcontroller 100. Specifically, in this case, it is possible to calculate the correction value for the dead time on the basis of the measured current amplitude, the maximum current amplitude and the slope of the variation of the dead time with current.

To determine the actual dead time MotPwmDiffCalc in each of the three formatted control signals MotPwmFbkU, MotPwmFbkV, MotPwmFbkW at a given time, the microcontroller 100 is configured to calculate the slope A of a straight line representing the variation of the dead time TM with current I.

Figure 11:
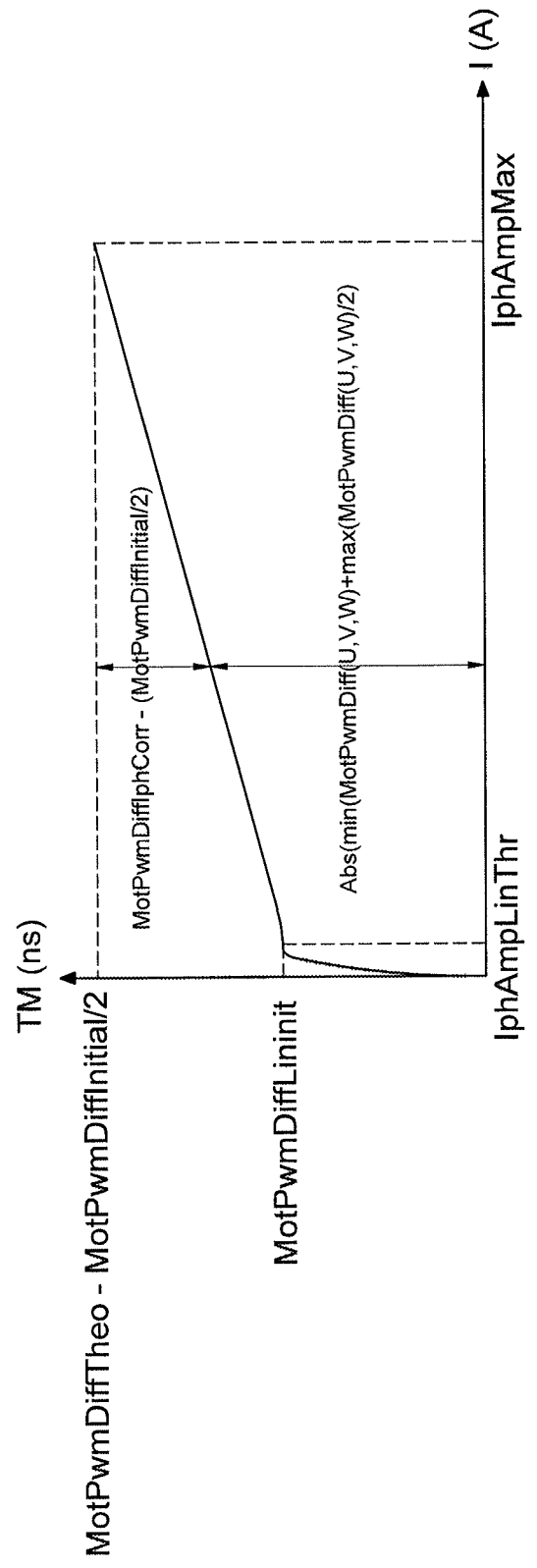
FIG. 11 schematically illustrates the variation of the actual dead time with current.
Figure 12:
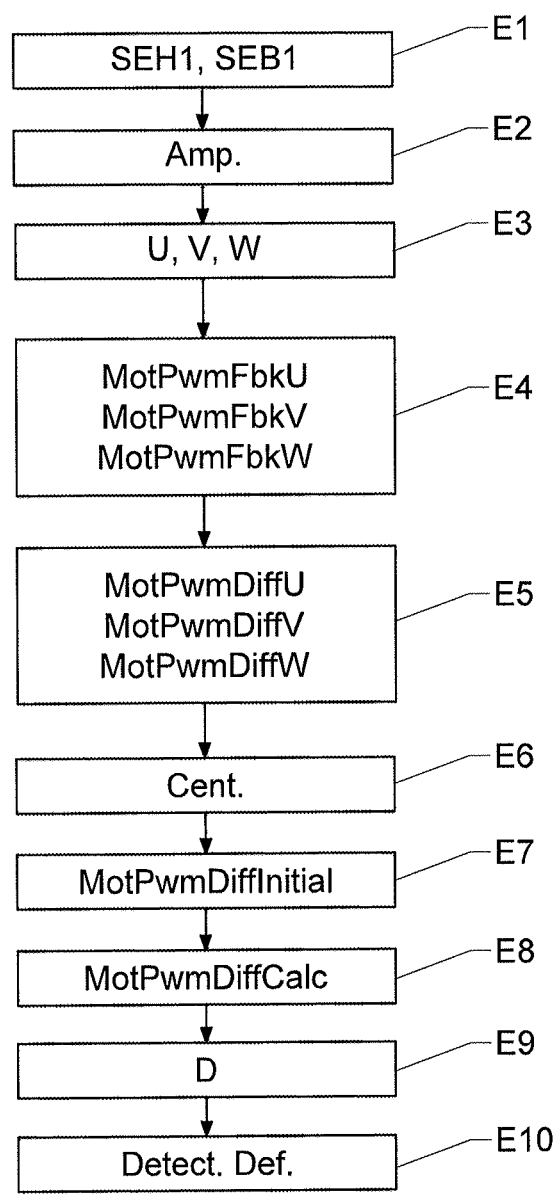
FIG. 12 illustrates an embodiment of the method according to an aspect of the invention.

To achieve this, with reference to FIG. 11, the microcontroller 100 is configured to calculate the slope A of the straight line representing the variation of the dead time TM with current I according to the following equation:

$$A = \frac{MotPwnDiffTheo - \frac{MotPwmDiffInitial}{2} - MotPwmDiffLinInit}{IphAmpMax - IphAmpLinThr}$$

MotPwmDiffLinInit is the dead time value corresponding to the current threshold IphAmpLinThr from which the dead time TM varies linearly with current and IphAmpMax is the maximum amplitude value of the current.

The microcontroller 100 is configured to calculate the difference MotPwmDiffIphCorr between the value of the inserted dead time MotPwmDiffTheo corrected for half of the predetermined measurement error MotPwmDiffInitial and the value of the dead time TM(I) at a given current I amplitude is calculated according to the following equation:

MotPwmDiffIphCorr=(IphAmpMax−ampl($i$))×$A$

The microcontroller 100 is configured to determine the observed dead time MotPwmDiffCalc according to the following equation:

$$MotPwmDiffCalc = MotPwmDiffIphCorr + \frac{X}{2} + \frac{MotPwmDiffInitial}{2}$$

where X=abs(min(MotPwmDiffCorrU,MotPwmDiffCorrV,MotPwmDiffCorrW)+max(MotPwmDiffCorrU,MotPwmDiffCorrV,MotPwmDiffCorrW)).

The microcontroller 100 is next configured to calculate the absolute difference D between the value of the inserted dead time MotPwmDiffTheo, corrected for the predetermined measurement error, and the value of the actual dead time MotPwmDiffCalc calculated at a given current I amplitude on the basis of the calculated slope A value.

The microcontroller 100 is lastly configured to detect a fault in the control of the motor 2 when the absolute value of the calculated difference D is higher than a predetermined detection threshold SD.

An aspect of the invention will now be described with reference to FIGS. 8 to 12.

First, in a step E1, the microcontroller 100 generates an initial high-stage signal SEH1 and an initial low-state signal SEB1 for each pair of transistors of the inverter 300 associated with one of the three phases.

In a step E2, the amplifier 200 amplifies an initial high-stage signal SEH1 and an initial low-state signal SEB1 generated for each phase of the motor 2 and transmits them to the inverter 300.

The inverter 300 generates, in a step E3, for each pair of transistors, a control signal U, V, W on the basis of the received amplified initial high-stage signal SEH1 and amplified initial low-state signal SEB1.

The measurement module 400 next measures, in a step E4, the current-control signals U, V, W generated by the inverter 300 for controlling the motor 2 and formats them as formatted control signals MotPwmFbkU, MotPwmFbkV, MotPwmFbkW.

The microcontroller 100 next calculates, in a step E5, for each phase of the motor 2, the difference MotPwmDiffU MotPwmDiffV, MotPwmDiffW between the expected duration MotPwmExpected and the duration MotPwmFbk of the formatted control signal MotPwmFbkU, MotPwmFbkV, MotPwmFbkW.

The microcontroller 100 next compensates, in a step E6, for each phase of the motor 2, for the calculated difference MotPwmDiffU, MotPwmDiffV, MotPwmDiffW so that it oscillates about a zero value with time t, as explained above.

In a step E7, the microcontroller 100 determines the measurement error MotPwmDiffInitial common to the three phases of the motor 2 by taking the mean of the temporal offsets calculated with zero current flowing through the high-stage transistor and the low-stage transistor for each phase of the motor 2. It will be noted that this step E7 may be carried out at any time prior to one of steps E1 to E6.

The microcontroller 100 determines, in a step E8, the actual dead time MotPwmDiffCalc present in each of the three control signals at a given time on the basis of the compensated temporal offsets MotPwmDiffCorrW for each phase of the motor 2, of the predetermined measurement error MotPwmDiffInitial common to the three phases of the motor 2 and of the value of the amplitude of the current I flowing through the transistors of the three pairs of transistors at said given time.

Determining the dead time observed in each of the three control signals MotPwmFbkU, MotPwmFbkV, MotPwmFbkW at a given time involves calculating the slope A of a straight line representing the variation of the dead time with current.

The slope A of the straight line representing the variation of the dead time with current is calculated according to the following equation:

$$A = \frac{MotPwnDiffTheo - \frac{MotPwmDiffInitial}{2} - MotPwmDiffLinInit}{IphAmpMax - IphAmpLinThr}$$

in which MotPwmDiffLinInit is the value of the dead time corresponding to the current threshold IphAmpLinThr from which the dead time varies linearly with current and IphAmpMax is the maximum amplitude value of the current.

The microcontroller 100 determines the observed dead time MotPwmDiffCalc according to the following equation:

$$MotPwmDiffCalc = MotPwmDiffIphCorr + \frac{X}{2} + \frac{MotPwmDiffInitial}{2}$$

where X=abs(min(MotPwmDiffCorrU,MotPwmDiffCorrV,MotPwmDiffCorrW)+max(MotPwmDiffCorrU,MotPwmDiffCorrV,MotPwmDiffCorrW)) and MotPwmDiffIphCorr corresponds to the difference between the value of the inserted dead time MotPwmDiffTheo corrected for half of the predetermined measurement error MotPwmDiffInitial and the value of the dead time TM(I) at a given current I amplitude is calculated according to the following equation:

MotPwmDiffIphCorr=(IphAmpMax−ampl($i$))×A

In a step E9, the microcontroller 100 calculates the absolute difference D between the determined dead time MotPwmDiffCalc and the inserted dead time MotPwmDiffTheo, the value of which is known thereto because it inserted it itself.

The microcontroller 100 thus detects a fault in the control of the motor 2 in a step E10 when the absolute value of the calculated difference D is higher than a predetermined detection threshold SD.

The method according to an aspect of the invention advantageously makes it possible to reliably diagnose faults in the current-mode control of an electric motor with a high level of accuracy of the order of 250 ns, thereby making the fault detection effective.

It is clarified furthermore that aspects of the present invention are not limited to the examples described above, and is open to many variants that are accessible to those skilled in the art.

The invention claimed is:

1. A method for diagnosing a fault in the control of a three-phase electric motor, each phase of said motor being current-mode controlled by a control signal, each control signal being pulse-width modulated and being generated at a midpoint of an assembly formed by a "high-stage" transistor connected to a battery of a vehicle and a "low-stage" transistor connected to ground based on a high-stage signal received by the high-stage transistor and a low-stage signal received by the low-stage transistor, the high-stage signal and the low-stage signal being pulse-width modulated signals, which signals are inverted with respect to one another and each high state of the high-stage signal of which is centered on a low state of the low-stage signal, said method comprising:

for each control signal for controlling a phase of the motor,
generating the high-stage signal and the low-stage signal, a start of a high state of the high-stage signal being temporally offset by a duration referred to as an "inserted dead time" with respect to the start of the corresponding low state of the low-stage signal,
generating the control signal on the basis of the generated high-stage signal and the low-stage signal,
measuring and formatting the control signal,
calculating a difference between a duration of a high state of the generated high-stage signal added a value of the inserted dead time and a duration of the formatted control signal, said difference varying sinusoidally with time,
compensating for the calculated difference so that it oscillates about a zero value with time,
calculating an actual dead time present in each of the three control signals at a given time on the basis of compensated temporal offsets for each phase of the motor, of a predetermined measurement error common to the three phases of the motor and of the value of an amplitude of current flowing through transistors of the "high-stage" transistor and "low-stage" transistor of each control signal at said given time,
calculating a difference between the calculated actual dead time and the inserted dead time, and
detecting a fault in the control of the motor when an absolute value of the calculated difference between the calculated actual dead time and the inserted dead time is higher than a predetermined detection threshold.

2. The method as claimed in claim 1, comprising a step of determining the predetermined measurement error common to the three phases of the motor, this determination operation being performed by taking the mean of temporal offsets calculated with zero current flowing through the high-stage transistor and the low-stage transistor for each phase of the motor.

3. The method as claimed in claim 2, wherein the operation of calculating the actual dead time in each of the three formatted control signals at a given time comprises:
calculating a slope of a straight line representing the variation of dead time with current,
calculating a difference between the value of the inserted dead time corrected for the predetermined measurement error and the value of the dead time at a given current amplitude on the basis of the calculated slope value.

4. The method as claimed in claim 1, wherein the operation of calculating the actual dead time in each of the three formatted control signals at a given time comprises:
calculating a slope of a straight line representing the variation of dead time with current,
calculating a difference between the value of the inserted dead time corrected for the predetermined measurement error and the value of the dead time at a given current amplitude on the basis of the calculated slope value.

5. The method as claimed in claim 4, wherein the slope of the straight line representing the variation of the dead time with current is calculated according to the following equation:

$$A = \frac{MotPwnDiffTheo - \frac{MotPwmDiffInitial}{2} - MotPwmDiffLinInit}{IphAmpMax - IphAmpLinThr}$$

in which MotPwmDiffTheo is a value of the inserted dead time, MotPwmDiffInitial is the predetermined measurement error, MotPwmDiffLinInit is a value of dead time corresponding to a current threshold IphAmpLinThr from which the dead time varies linearly with current and IphAmpMax is a maximum amplitude value of the current.

6. The method as claimed in claim 5, wherein the difference between the value of the inserted dead time corrected for half of the predetermined measurement error and the value of the dead time at a given current amplitude is calculated according to the following equation:

MotPwmDiffIphCorr=(IphAmpMax−ampl($i$))×$A$ where MotPwmDiffIphCorr is a, difference between the value of the inserted dead time MotPwmDiffTheo corrected for half of the predetermined measurement error MotPwmDiffInitial and a value of dead time TM(I) at a given current i amplitude.

7. The method as claimed in claim 6, wherein the actual dead time is calculated according to the following equation:

$$MotPwmDiffCalc = MotPwmDiffIphCorr + \frac{X}{2} + \frac{MotPwmDiffInitial}{2}$$

where X=abs(min(MotPwmDiffCorrU,MotPwmDiffCorrV,MotPwmDiffCorrW)+max(MotPwmDiffCorrU,MotPwmDiffCorrV,MotPwmDiffCorrW)), in which MotPwmDiffCalc is the calculated actual dead time, and MotPwmDiffCorrU, MotPwmDiffCorrV, MotPwmDiffCorrW are compensated temporal offsets for each phase U, V, W of the motor.

8. A device for diagnosing a fault in the control of a three-phase electric motor, each phase of said motor being current-mode controlled by a control signal, each control signal being pulse-width modulated and being generated at the midpoint of an assembly formed by a "high-stage" transistor connected to a battery of a vehicle and a "low-stage" transistor connected to ground on the basis of a high-stage signal received by the high-stage transistor and a low-stage signal received by the low-stage transistor, the high-stage signal and the low-stage signal being pulse-width modulated signals, which signals are inverted with respect to one another and each high state of the high-stage signal of which is centered on a low state of the low-stage signal, said device comprising:

a microcontroller configured to generate, for each control signal for controlling a phase of the motor, the high-stage signal and the low-stage signal, the start of a high state of the high-stage signal being temporally offset by a duration referred to as an "inserted dead time" with respect to the start of the corresponding low state of the low-stage signal, an amplifier configured to amplify said high-stage and low-stage signals, an inverter configured to generate, for each phase of the motor, the respective control signal on the basis of the amplified high-stage signal and the amplified low-stage signal, a measurement module configured to measure and to format the generated control signals, the microcontroller further being configured:

to calculate, for each control signal for controlling a phase of the motor, a difference between a duration of a high state of the generated high-stage signal added to a value of the inserted dead time and a duration of the formatted control signal, said difference varying sinusoidally with time, to compensate, for each control signal for controlling a phase of the motor, for the calculated difference so that it oscillates about a zero value with time, to calculate an actual dead time present in each of the three control signals at a given time on the basis of compensated temporal offsets for each phase of the motor, of a predetermined measurement error common to the three phases of the motor and of the value of the amplitude of the current flowing through transistors of the "high-stage" transistor and "low-stage" transistor of each control signal at said given time, to calculate the difference between the calculated actual dead time and the inserted dead time, to detect a fault in the control of the motor when the absolute value of the calculated difference between the calculated actual dead time and the inserted dead time is higher than a predetermined detection threshold.

9. The device as claimed in claim 8, configured to determine the predetermined measurement error common to the three phases of the motor, this determination operation being performed by taking the mean of the temporal offsets calculated with zero current flowing through the high-stage transistor and the low-stage transistor for each phase of the motor.

10. The device as claimed in claim 9, configured to calculate a slope of a straight line representing a variation of dead time with current, and to calculate a difference between the value of the inserted dead time corrected for the predetermined measurement error and the value of the dead time at a given current amplitude on the basis of the calculated slope value so as to calculate the actual dead time in each of the three formatted control signals at a given time.

11. The device as claimed in claim 8, configured to calculate a slope of a straight line representing a variation of dead time with current, and to calculate a difference between the value of the inserted dead time corrected for the predetermined measurement error and the value of the dead time at a given current amplitude on the basis of the calculated slope value so as to calculate the actual dead time in each of the three formatted control signals at a given time.

12. The device as claimed in claim 11, wherein the slope of the straight line representing the variation of the dead time with current is calculated according to the following equation:

$$A = \frac{MotPwnDiffTheo - \frac{MotPwmDiffInitial}{2} - MotPwmDiffLinInit}{IphAmpMax - IphAmpLinThr}$$

in which MotPwmDiffTheo is a value of the inserted dead time, MotPwmDiffInitial is the predetermined measurement error, MotPwmDiffLinInit is a value of dead time corresponding to a current threshold IphAmpLinThr from which the dead time varies linearly with current and IphAmpMax is a maximum amplitude value of the current, the difference between the value of the inserted dead time corrected for half of the predetermined measurement error and the value of the dead time at a given current amplitude is calculated according to the following equation:

MotPwmDiffIphCorr=(IphAmpMax−ampl($i$))×$A$ and the calculated actual dead time is determined according to the following equation:

$$MotPwmDiffCalc = MotPwmDiffIphCorr + \frac{X}{2} + \frac{MotPwmDiffInitial}{2}$$

where X=abs(min(MotPwmDiffCorrU,MotPwmDiffCorrV,MotPwmDiffCorrW)+max(MotPwmDiffCorrU, MotPwmDiffCorrV,MotPwmDiffCorrW)), in which MotPwmDiffIphCorr is a difference between the value of the inserted dead time MotPwmDiffTheo corrected for half of the predetermined measurement error MotPwmDiffInitial and a value of dead time TM(I) at a given current i amplitude, MotPwmDiffCalc is the calculated actual dead time, and MotPwmDiffCorrU, MotPwmDiffCorrV, MotPwmDiffCorrW are compensated temporal offsets for each phase U, V, W of the motor.

\* \* \* \* \*